United States Patent [19]

Walter et al.

[11] Patent Number: 5,774,322
[45] Date of Patent: Jun. 30, 1998

[54] THREE WIRE POWER SUPPLY CIRCUIT

[75] Inventors: Mark Richard Walter, Bridgeport; David Philip Eckel, Wetherfield; Thomas James Batko, Wallingford, all of Conn.

[73] Assignee: Hubbell Incorporated, Orange, Conn.

[21] Appl. No.: 501,847

[22] Filed: Jul. 13, 1995

Related U.S. Application Data

[63] Continuation-in-part of Ser. No. 412,502, Mar. 29, 1995, which is a continuation of Ser. No. 382,691, Feb. 2, 1995, abandoned.

[51] Int. Cl.$^6$ .................................................. H01H 47/22
[52] U.S. Cl. ........................................... 361/170; 361/160
[58] Field of Search ..................................... 361/160, 170, 361/189, 190; 307/116, 140, 143

[56] References Cited

U.S. PATENT DOCUMENTS

| | | | |
|---|---|---|---|
| 4,340,826 | 7/1982 | Muchnick | 307/157 |
| 4,414,653 | 11/1983 | Pettinger | 367/139 |
| 4,617,501 | 10/1986 | Smith | 361/91 |
| 4,713,598 | 12/1987 | Smith | 323/245 |
| 5,223,795 | 6/1993 | Blades | 361/113 |

OTHER PUBLICATIONS

Product Brochure For Hubbell H. Moss Passive Infrared Wall Switch Sensor Models 1500A & 750A, 1993.

*Primary Examiner*—Fritz Fleming
*Attorney, Agent, or Firm*—Jerry M. Presson; Stacey J. Longanecker

[57] ABSTRACT

A power supply circuit is provided for use in combination with a load and an alternating current (AC) power source for selectively connecting and disconnecting the load and the AC power source. The load is connected between a neutral conductor of the AC power source and the power supply circuit. The power supply circuit is connected to a power or hot line conductor and a ground conductor of the AC power source. The power supply circuit comprises relay connected in series between the load and the line conductor; a control circuit for selectively operating the relay; and a transformer. The primary winding of the transformer is connected in series with the line conductor and the ground conductor for supplying power to the control circuit even when the load is disconnected from the AC power source. The power supply circuit comprises a switch in series with the primary winding of the potential transformer for interrupting the primary winding current at frequencies above the AC line frequency. The power supply circuit can also comprise a slide or air gap switch to isolate the power supply circuit from the AC power source when the air gap switch is in the OFF position or to limit current to an acceptable level. The air gap switch can be configured to pulse the primary winding current above the accepted level.

11 Claims, 2 Drawing Sheets

THREE WIRE POWER SUPPLY CIRCUIT

This application is a continuation-in-part of U.S. patent application Ser. No. 08/412,502, filed Mar. 29, 1995, which is a continuation of U.S. patent application Ser. No. 08/382,691, filed Feb. 2, 1995 (abandoned), the entire subject matter of which is hereby incorporated herein by reference for all purposes.

FIELD OF THE INVENTION

The invention relates to a three wire electrical power supply circuit for connecting a load to an alternating current (AC) power source and supplying power to a load switching element when the load is disconnected from the power source.

BACKGROUND OF THE INVENTION

A number of electrical power supply circuits such as wall switch units for lighting fixtures are potentially hazardous to individuals (e.g., repairmen). They comprise an ON/OFF switch or other identified or implied OFF function which most users assume isolates the circuit from the power source when the switch is off. In other words, a user may assume during servicing and maintenance that there are no live parts on the load side of the power supply circuit while the power supply circuit is in the identified OFF mode.

Until recently, safety requirements under the Underwriters Laboratories (UL) standard 773 for nonindustrial photoelectric switches for lighting control have not been as stringent as requirements for other electric control circuits in different environments, and most ON/OFF switches and OFF mode identifying functions have been in compliance with the UL 773 standard. New safety standards have been devised, however, under the newly proposed UL 773A standard which requires an air gap switch in these types of electrical circuits. The newly proposed UL 773A standard requires that a power supply circuit incorporate either an air gap switch, or a solid-state switching device which restricts leakage currents to 0.5 milliamperes or less to the load. Also, in three wire systems, the leakage to ground is proposed to be limited to 0.5 milliamperes, as well.

A need exists for a power supply circuit which complies with the newly proposed UL 773A standard, particularly in the manner with which it derives operating current and the maximum allowable return current, either through the load or ground. Control circuitry for many power supply circuits requires power or operating current apart from the power used to operate the load. For example, a wall switch unit with an occupancy sensor is available which controls a switch to automatically connect and disconnect a lighting fixture to and from a power source in response to the detection of movement near the sensor. With reference to FIG. 1, the wall switch unit 10 comprises a switch 12 which has one terminal connected to a load 14 and another terminal connected to an AC power or "hot" line 16. The load 14 in turn is connected to the neutral conductor 18 of the power source. When the wall switch unit 10 is off, sufficient voltage differential exists between the line and load connections to operate a power supply 20 for energizing the switch control circuitry 22 in the wall switch unit, but not when the load has burned open. When the switch is closed, i.e., the wall switch unit is on and the load is energized, there is insufficient voltage differential to operate the switch control circuitry.

One solution for providing operating power when the load is connected to the power source is to provide a switch mechanism that is controlled to rapidly open and close during each cycle or half-cycle of the AC waveform. The duty cycle (i.e., the ratio of the switch open time to the switch closed time) is sufficiently low, and the external load receives full-rated power, yet sufficient voltage differential exists to derive operating power for the control circuitry during the off cycles.

This solution is disadvantageous because semiconductor or other electronic switch mechanisms are generally required to switch rapidly during each cycle or half-cycle. Relay switching mechanisms are generally not sufficiently responsive, yet they are preferred over electronic switching mechanisms. Electronic switching mechanisms are more prone to leakage currents and are not as reliable as relay switching mechanisms. Leakage currents are of particular concern because of safety standards for devices such as photoelectric wall switches as described above.

In applications where relay switching mechanisms are preferred, a circuit configuration such as that disclosed in the U.S. Pat. No. 4,340,826 to Muchnick may be used. With reference to FIG. 2, the Muchnick patent discloses an electrical switching circuit 24 comprising a pilot or indicator light 26 to indicate the state of energization of the load 14 controlled by a switch 30. The patent addresses the problem of connecting the pilot or indicator light to the switch 30 such that the pilot light is energized when the switch is closed. The switch makes use of a third wire 32, the ground conductor, which is available in most wall boxes. A full line potential exists between the hot conductor 16 and the ground conductor 32 for driving the pilot light 26 when the switch 30 is closed.

U.S. Pat. No. 4,713,598 discloses a switching circuit 36 which does not rely on the presence of a ground conductor 32, but instead uses a current transformer XFR to derive operating current, as shown in FIG. 3. The primary winding of the transformer XFR is in series with a switching mechanism SW (e.g., a relay). When the switching mechanism SW is closed, current flows through the primary winding W1 and is induced in the secondary winding W2. Voltage across the secondary winding provides operating power via a power supply 42 for the control circuitry 44. When the switching mechanism is open, the voltage differential for deriving operating current is across the secondary winding W2 to operate a power supply 42.

One of the drawbacks of this design is possible noncompliance with the newly proposed UL 773A safety standard. When the relay SW is open, the device 36 is still electrically connected to the AC source via the capacitor C2 and the secondary winding W2. When analyzed with electronic test equipment, it can be found on some devices that a 2.5 milliamp current flows through the secondary winding W2 of the transformer XFR even though the switching mechanism SW is in the OFF or open position and the load (e.g., a lamp) is no longer energized by the power source. Further, the device 36 does not appear to comprise energy or memory storage means for interrupting the full line to load current path when the load has been opened prior to the device 36 being put in an OFF position by, for example, a slide switch (not shown) or other identified or implied OFF switch. Thus, if the switch SW is a latching relay, and the lamp has burned open, it appears that a repairman could be exposed to full AC line current (e.g., 15 amperes) because the power supply circuit in FIGS. 2 and 3 does not provide means for changing the state of the switch SW. No identified or implied OFF switch is provided to either directly or indirectly open the current path to the load. The lamp, therefore, is actually powered on until the relay SW is opened, regardless of whether the slide switch is placed in the OFF position. In addition, current transformers also have a minimum load requirement. Thus, a need exists for a power supply circuit which complies with the newly proposed UL 773A standard.

SUMMARY OF THE INVENTION

The disadvantages and deficiencies of existing power supply circuits are overcome by the present invention. In accordance with an embodiment of the present invention, a power supply circuit is provided which comprises a potential transformer connected between a power or hot line conductor of AC power source and a ground conductor thereof to supply operating current when the load switch is closed.

In accordance with another embodiment of the present invention, a power supply circuit is provided which comprises a switch in series with the primary winding of the potential transformer for interrupting the primary winding current at frequencies above the AC line frequency. The switch creates a minimal primary magnetizing current for minimizing transformer size.

In accordance with yet another embodiment of the present invention, the power supply circuit is provided which comprises a slide or air gap switch connected to the power or hot line conductor to isolate the power supply circuit from the AC power source when the air gap switch is in the OFF position. The air gap switch can be configured to provide an open circuit, or to limit current to an approved level (e.g., 0.5 milliamperes as required by the newly proposed UL 773A standard).

In accordance with various embodiments of the present invention, a number of three wire power supply circuits are provided which comprise at least one air gap off switch to interrupt a current path or to limit current to an acceptable level.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF PREFERRED EMBODIMENTS

Figure 1:
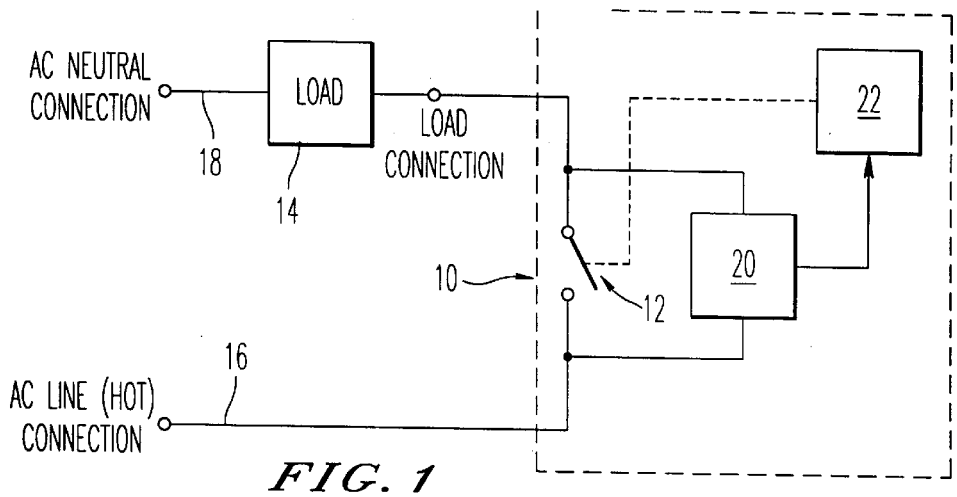
FIG. 1 is a schematic diagram of a conventional wall switch unit.
Figure 2:
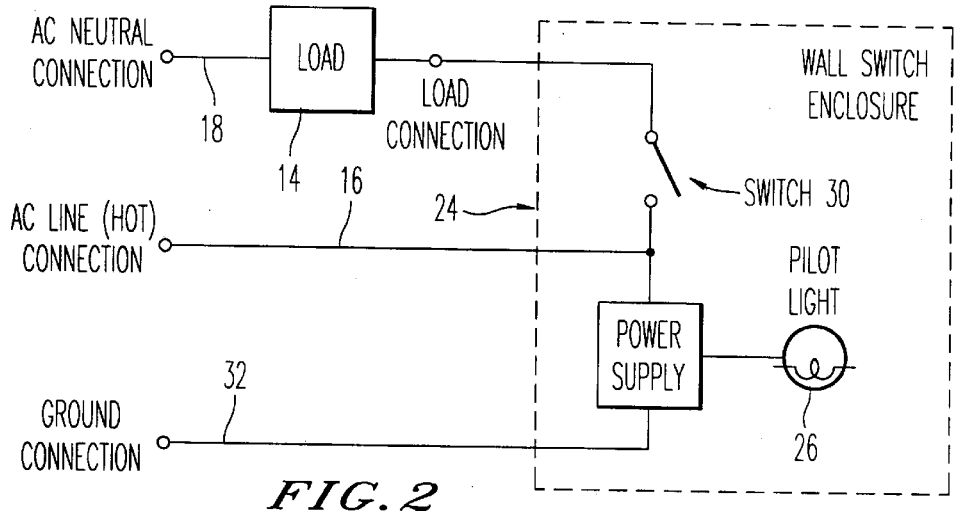
FIG. 2 is a schematic diagram of a prior art three wire wall switch unit comprising a pilot light.
Figure 3:
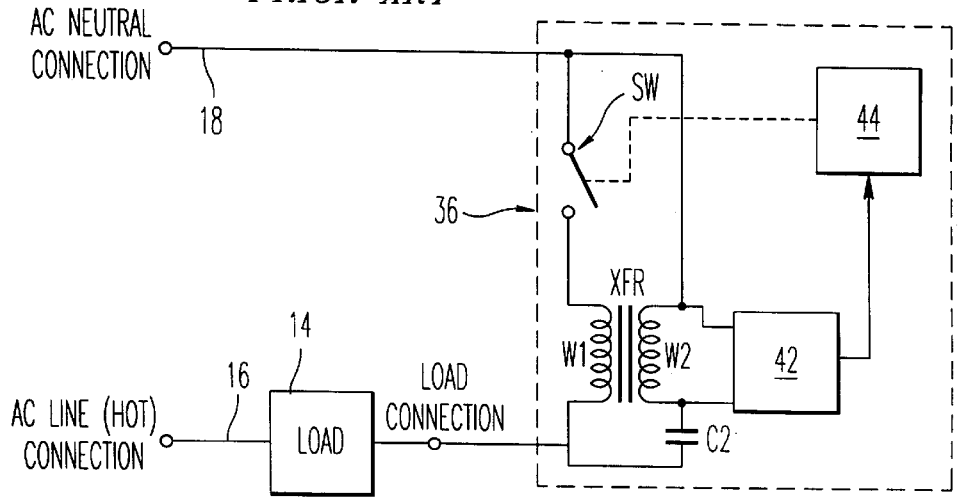
FIG. 3 is a schematic diagram of another prior art wall switch unit.
Figure 4:
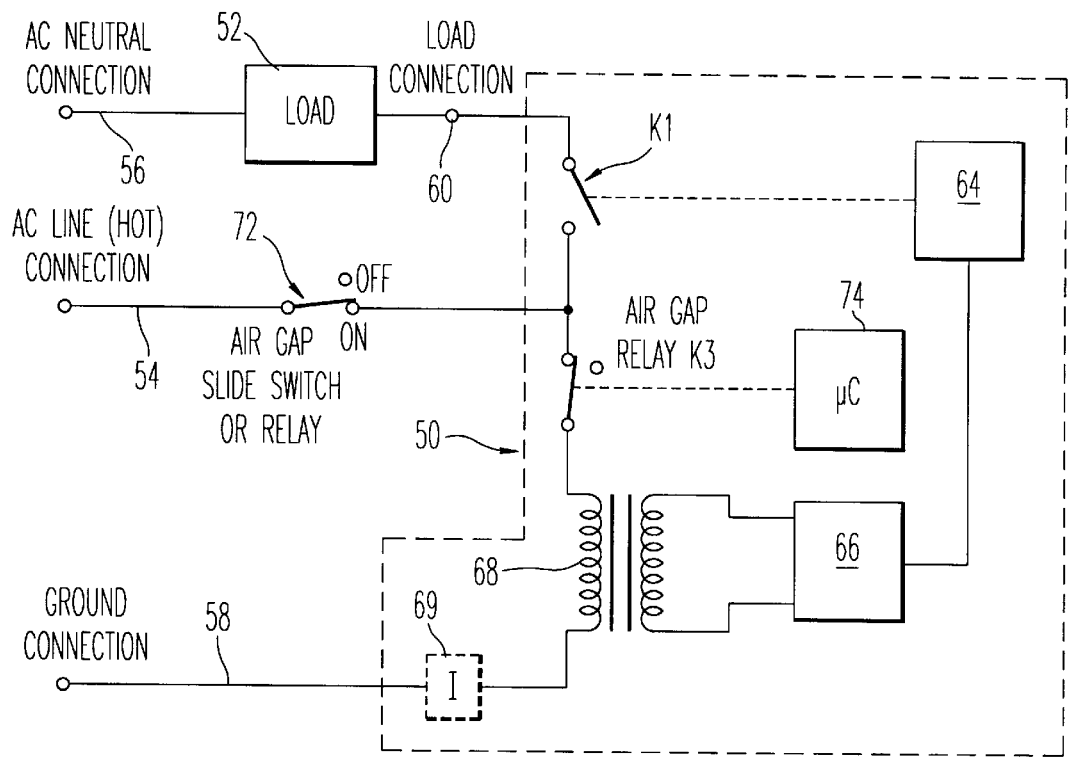
FIGS. 4 and 5 are schematic diagrams of three wire power supply circuits constructed in accordance with two preferred embodiments of the present invention.

FIG. 4 depicts a power supply circuit 50 constructed in accordance with an embodiment of the present invention. The power supply circuit controls the application of power from an AC power source to a load 52 (e.g., a lighting fixture). The power source is represented by line, neutral and ground conductors 54, 56 and 58, respectively, to the AC main throughout the various views. The load is connected to the neutral conductor 56 of the AC power source. The power supply circuit 50 is connected to the load via a load conductor 60, and is connected to the AC power source via the AC power or hot line conductor 54 and the ground conductor 58.

With continued reference to FIG. 4, the power supply circuit 50 comprises a switch mechanism K1 for controllably completing or interrupting the current path between the line or power conductor 54 and the return path to the AC power source, i.e., the load conductor 60, the load 52 and the neutral conductor 56. The switch mechanism (e.g., relay K1) can be, but is not limited to, a slide switch, a press switch, a relay, a semiconductor switch, an optocoupler, a thyristor, or any other mechanical, electromechanical or electronic device for opening and closing a circuit. The switching mechanism can be controlled manually (e.g., a press button or slide switch), or by an electronic control circuit which can, but does not require, operation of a microcontroller. In accordance with an aspect of the invention, an electronic control circuit 64 is preferably used. The electronic control circuit receives operating current from a power supply 66. The power supply 66 is connected across the secondary winding of a transformer 68, the primary winding of which is connected between the power or hot line conductor 54 and the ground conductor 58.

The transformer 68 is preferably a potential transformer. In operation, current flows into the primary winding of the potential transformer, which steps down the voltage to generate a low voltage output at the secondary winding with a relatively high current capacity. The voltage ratio of the transformer can be, for example, 20:1 or 120 volts root mean square ($V_{rms}$) in, 6 $V_{rms}$ out, with an output current capacity of approximately 10 milliamperes. Thus, the newly proposed UL 773A standard recommendation of 0.5 milliamperes maximum leakage current limit is not exceeded because only 0.5 milliampere current flows in the primary winding if a 10 milliampere current flows in the secondary winding due to the ratio. Another advantage of using a potential transformer in lieu of a current transformer is the elimination of high current flow in the primary winding, and therefore restricting the resulting high wire and core losses and power dissipation that are associated with current transformers. Thus, the power supply circuit 50 can provide an operating current above 0.5 milliamperes without relying on a current transformer. The transformer 68, however, can be a current transformer with or without an impedance 69 in series therewith.

The potential transformer 68 typically requires a no load magnetizing current which flows into the primary winding to produce the operating flux in the core of the transformer. The operating flux produces an opposing voltage potential in the primary winding to limit the current flow therein. The magnetizing current does not produce useful current output at the secondary winding. Further, it is considered with respect to current limits set forth in safety standards, codes and regulations.

In accordance with another aspect of the invention, the magnetizing current is minimized. Rather than using a transformer with a larger number of turns and relatively large core area factor, which generally necessitates an undesirable large core, the invention can employ a switch K2 and a chopper circuit 70 in series with the primary winding of the transformer, as shown in FIG. 5.

Figure 5:
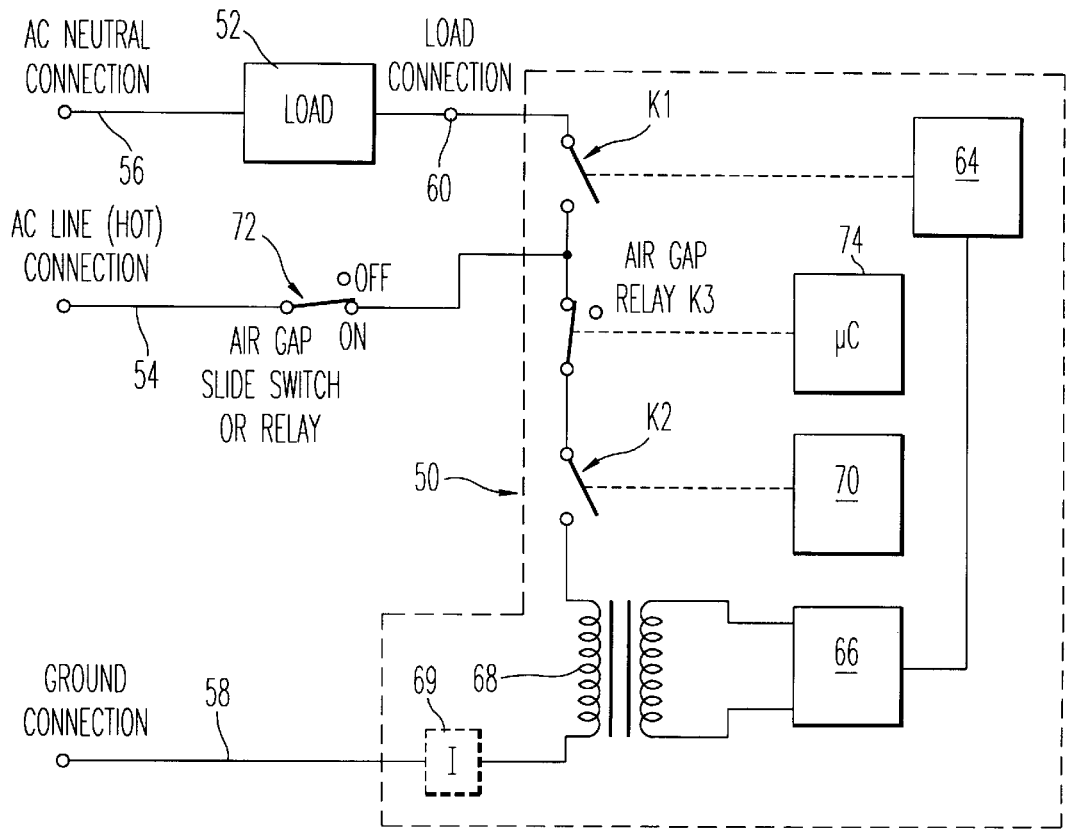

With reference to FIG. 5, the chopper circuit 70 operates the transformer via the switch K2 at frequencies higher than the nominal frequency of the AC line voltage (i.e, 60 hertz). The chopper circuit interrupts the current in the primary winding at rates which are preferably much greater than the line frequency, such as 20 kilohertz. The chopper circuit 70 is useful to pulse the current flowing into the primary winding of the transformer to selectively increase or decrease the current output from the secondary winding. The transformer size can therefore be minimized, along with the power temperature rating and the associated losses and cost.

In accordance with another aspect of the present invention, the power supply circuit is provided with an air gap switch 72, as shown in FIGS. 4 and 5. The air gap switch 72 can be, but is not limited to, a slide switch, a press switch, a relay, a semiconductor switch, an optocoupler, a thyristor, or any other mechanical, electromechanical or electronic device for opening and closing a circuit. The air gap switch 72 can be controlled manually (e.g., a press button or slide switch), or by an electronic control circuit which can, but does not require, operation of a microcontroller. In addition, the air gap switch can be placed on the power or hot line conductor or the load conductor outside the wall switch enclosure of the switching unit 50. The air gap switch in FIG. 4 interrupts the flow of current to the relay and the transformer when placed in the OFF position. The air gap switch in FIG. 5 interrupts the flow of current to the relay and the load but not to the transformer 68. Thus, line to ground current is available through the transformer. The air gap switch can also be configured as a logic-controlled relay K3 placed in series with the transformer between the line and ground conductors. For example, a microcontroller 74 can be programmed to open and close a relay at a selected rate to pulse the primary winding current above an approved level (e.g., 0.5 milliamperes as required by the newly proposed UL 773A standard). Pulsing the primary winding current at a constant or varying duty cycle can be useful to obtain a large input voltage range to charge a capacitor, for example, for energizing a circuit component such as a light emitting diode or buzzer. This method also allows for the steady state current to be controllably derived or programmable to any value; however, it is preferable that the value be less than 0.5 milliamperes for the reasons stated herein.

While certain advantageous embodiments have been chosen to illustrate the invention, it will be understood by those skilled in the art that various changes and modifications can be made herein without departing from the scope of the invention as defined in the appended claims.

What is claimed is:

1. A power supply circuit for use in combination with a load and an alternating current (AC) power source for selectively connecting and disconnecting the load and the AC power source, the load being connected between a neutral conductor of the AC power source and the power supply circuit, the power supply circuit being connected to a hot line conductor and a ground conductor of the AC power source, the power supply circuit comprising:

a relay having one terminal connected to said load and another terminal connected to said line conductor;

a control circuit for selectively operating said relay; and a transformer, the primary winding of said transformer being connected in series with said line conductor and said ground conductor for supplying power to said control circuit when the load is disconnected from the AC power source via said relay, said transformer being configured to step down the voltage between said line conductor and said ground conductor.

2. A power supply circuit as claimed in claim 1, wherein said transformer is a potential transformer.

3. A power supply circuit as claimed in claim 2, wherein said transformer is characterized by a voltage ratio of about 20 to 1.

4. A power supply circuit as claimed in claim 1, wherein said transformer is configured to limit current from said line conductor to said ground conductor.

5. A power supply circuit as claimed in claim 4, further comprising at least one of a plurality of circuit elements comprising a resistor and a capacitor connected to said primary winding of said transformer for limiting current from said line conductor to said ground conductor.

6. A power supply circuit as claimed in claim 4, wherein said transformer is configured to limit steady state current from said line conductor to said ground conductor to a maximum of 0.5 milliamperes.

7. A power supply circuit as claimed in claim 1, further comprising:

a switch connected in series with said line conductor, said primary winding of said transformer and said ground conductor; and a switch control circuit connected to said switch for interrupting current provided to said primary winding from said line conductor at a rate that is greater than the line frequency of said AC power source.

8. A power supply circuit as claimed in claim 7, wherein said switch control circuit is operable to pulse said current provided to said primary winding from said line conductor for selectively increasing and decreasing current output from said secondary winding.

9. A power supply circuit as claimed in claim 1, further comprising air gap switch connected to said line conductor to interrupt the flow of current to said relay and said transformer when activated.

10. A power supply circuit as claimed in claim 1, wherein said transformer is a current transformer, and further comprising an impedance in series with said transformer to limit current.

11. A power supply circuit as claimed in claim 1, further comprising air gap switch connected to said load to interrupt the flow of current to said relay and said load when activated.

* * * * *